(12) United States Patent
Saito et al.

(10) Patent No.: US 8,328,525 B2
(45) Date of Patent: Dec. 11, 2012

(54) ELECTRIC COMPRESSOR AND CONTROL DEVICE FOR ESTIMATING COMPRESSOR DISCHARGE TEMPERATURE

(75) Inventors: Satoru Saito, Takasaki (JP); Tomokazu Naruta, Isesaki (JP); Shigeyuki Koyama, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 1037 days.

(21) Appl. No.: 12/162,302

(22) PCT Filed: Jan. 11, 2007

(86) PCT No.: PCT/JP2007/050204
§ 371 (c)(1),
(2), (4) Date: Jul. 25, 2008

(87) PCT Pub. No.: WO2007/086257
PCT Pub. Date: Aug. 2, 2007

(65) Prior Publication Data
US 2009/0041598 A1 Feb. 12, 2009

(30) Foreign Application Priority Data
Jan. 25, 2006 (JP) .................................. 2006-016982

(51) Int. Cl.
*F04B 49/00* (2006.01)
(52) U.S. Cl. .................... 417/32; 417/44.1; 62/228.3
(58) Field of Classification Search .................... 417/14, 417/32, 44.1, 44.11; 62/228.1, 228.3, 230; 702/41, 42, 43, 44, 138
See application file for complete search history.

(56) References Cited

U.S. PATENT DOCUMENTS

| 4,706,470 A * | 11/1987 | Akazawa et al. ............... 62/209 |
| 5,054,294 A * | 10/1991 | Dudley ........................ 62/228.4 |
| 5,368,446 A * | 11/1994 | Rode .............................. 417/18 |
| 5,820,350 A * | 10/1998 | Mantey et al. .................. 417/45 |
| 6,564,627 B1 * | 5/2003 | Sabini et al. .................... 73/168 |
| 2005/0217292 A1 * | 10/2005 | Onishi et al. .................... 62/197 |
| 2005/0247073 A1 * | 11/2005 | Hikawa et al. ............... 62/228.1 |

FOREIGN PATENT DOCUMENTS

JP 2000-291557 A 10/2000

OTHER PUBLICATIONS

RD436087A, Aug. 2000.*

* cited by examiner

*Primary Examiner* — Devon Kramer
*Assistant Examiner* — Nathan Zollinger
(74) *Attorney, Agent, or Firm* — Baker Botts L.L.P.

(57) ABSTRACT

An inverter-integrated electric compressor has a control device. The control device estimates a compressor suction pressure based on the temperature of the power element of the inverter, or directly measures the compressor suction pressure by a sensor, or estimates the compressor suction pressure based on a compressor suction temperature or on a compressor housing temperature. Further, the control device calculates a motor torque based on a motor rotational speed, a motor phase current, and a motor phase voltage, estimates a compressor discharge pressure based on the compressor suction pressure and the motor torque, and estimates a compressor discharge temperature based on the compressor suction pressure and the compressor discharge pressure. The electric compressor has a discharge temperature detection device in place of a conventional thermal protector.

4 Claims, 2 Drawing Sheets

ELECTRIC COMPRESSOR AND CONTROL DEVICE FOR ESTIMATING COMPRESSOR DISCHARGE TEMPERATURE

CROSS-REFERENCE TO RELATED APPLICATIONS

This application is the National Stage of International Patent Application No. PCT/JP2007/050204, filed Jan. 11, 2007, which claims the benefit of Japanese Patent Application No. 2006-016982, filed Jan. 25, 2006, the disclosures of which are incorporated herein by reference in their entirety.

TECHNICAL FIELD OF THE INVENTION

The present invention relates to an inverter-integrated or an inverter-separated electric compressor.

BACKGROUND ART OF THE INVENTION

A motor rotational speed is controlled generally by an inverter, and an inverter-integrated electric compressor, provided with such an inverter integrally, is disclosed in Patent document 1, etc. Further, an electric compressor is provided, for example, in a refrigerant circuit of an air conditioner for vehicles, and in the air conditioner for vehicles, generally, a thermal protector for detecting a compressor discharge temperature is provided in order to protect a refrigerant hose connecting a discharge port of a compressor to a condenser of the air conditioner and the compressor itself from overheating.

Providing the above-described thermal protector causes problems such as decrease of design freedom of the compressor in a case where a mounting space for the compressor is ensured, and increase of the number of parts for the compressor ascribed to addition of parts for attaching the thermal protector.

Patent document 1: JP-A-2000-291557

DISCLOSURE OF THE INVENTION

Problems to be Solved by the Invention

Paying attention to the above-described problems, an object of the present invention is to provide an inverter-integrated or an inverter-separated electric compressor having a discharge temperature detection means in place of a thermal protector.

Means for Solving the Problems

To achieve the above-described object, an inverter-integrated electric compressor according to the present invention has a control device which estimates a compressor suction pressure based on a temperature of a power element of an inverter, which calculates a motor torque based on a motor rotational speed and motor phase current and phase voltage, which estimates a compressor discharge pressure based on the compressor suction pressure and the motor torque, and which estimates a compressor discharge temperature based on the compressor suction pressure and the compressor discharge pressure.

A thermistor is mounted in the power element of the inverter in order to protect it from overheating. In the above-described inverter-integrated electric compressor, the power element of the inverter is attached to a compressor housing at a position near a suction port in order to be cooled by sucked refrigerant, also as shown in FIG. 1 of Patent document 1. Therefore, a compressor suction pressure can be estimated by estimating a compressor suction temperature based on the temperature of the power element detected by the thermistor mounted on the power element of the inverter, based on the saturated vapor curve of the refrigerant. Because the inverter recognizes a motor rotational speed and motor phase current and phase voltage, a motor torque can be calculated based on the motor rotational speed and the motor phase current and phase voltage. A compressor discharge pressure can be estimated based on the compressor suction pressure and the motor torque, if the correlation among the compressor suction pressure, the motor torque and the compressor discharge pressure is determined in advance. A compressor discharge temperature can be estimated based on the compressor suction pressure and the compressor discharge pressure, if the correlation among the compressor suction pressure, the compressor discharge pressure and the compressor discharge temperature is determined in advance. Therefore, if a control device which carries out a series of the above-described operations is mounted in the inverter-integrated electric compressor, an inverter-integrated electric compressor having a discharge temperature detection means in place of a thermal protector can be realized.

Further, the present invention also provides an inverter-separated electric compressor. Namely, an inverter-separated electric compressor according to the present invention has a control device which measures a suction pressure, which calculates a motor torque based on a motor rotational speed and motor phase current and phase voltage, which estimates a compressor discharge pressure based on the compressor suction pressure and the motor torque, and which estimates a compressor discharge temperature based on the compressor suction pressure and the compressor discharge pressure.

Further, an inverter-separated electric compressor according to the present invention has a control device which measures a compressor suction temperature, which estimates a compressor suction pressure based on the compressor suction temperature, which calculates a motor torque based on a motor rotational speed and motor phase current and phase voltage, which estimates a compressor discharge pressure based on the compressor suction pressure and the motor torque, and which estimates a compressor discharge temperature based on the compressor suction pressure and the compressor discharge pressure.

Further, an inverter-separated electric compressor according to the present invention has a control device which measures a compressor housing temperature at a position near a suction port, which estimates a compressor suction pressure based on the compressor housing temperature, which calculates a motor torque based on a motor rotational speed and motor phase current and phase voltage, which estimates a compressor discharge pressure based on the compressor suction pressure and the motor torque, and which estimates a compressor discharge temperature based on the compressor suction pressure and the compressor discharge pressure.

In such an inverter-separated electric compressor according to the present invention, a compressor suction pressure is directly measured by providing a pressure sensor, or a compressor suction pressure is estimated from a compressor suction temperature or a compressor housing temperature at a position near a suction port, measured by a temperature sensor provided. Then, similarly to the above-described inverter-integrated electric compressor, because an inverter recognizes a motor rotational speed and motor phase current and phase voltage, a motor torque can be calculated based on the motor rotational speed and motor phase current and phase voltage. A compressor discharge pressure can be estimated based on the compressor suction pressure and the motor torque, if the correlation among the compressor suction pressure, the motor torque and the compressor discharge pressure is determined in advance. A compressor discharge temperature can be estimated based on the compressor suction pressure and the compressor discharge pressure, if the correlation among the compressor suction pressure, the compressor discharge pressure and the compressor discharge temperature is determined in advance. Therefore, if the control device which carries out a series of the above-described operations is mounted in the inverter-separated electric compressor, an inverter-separated electric compressor having a discharge temperature detection means in place of a thermal protector can be realized.

In a preferable embodiment of the present invention, the above-described control device turns off the compressor when the compressor discharge temperature is equal to a predetermined value or higher. Because the above-described control device turns off the compressor when the compressor discharge temperature is equal to a predetermined value or higher, an overheat of a refrigerant hose connecting a discharge port of the compressor to a condenser of an air conditioner, and the compressor itself, can be prevented.

The above-described inverter-integrated and inverter-separated electric compressors according to the present invention are suitable as compressors to be provided in a refrigerant circuit of an air conditioner for vehicles.

Effect According to the Invention

Thus, according to the present invention, an inverter-integrated or inverter-separated electric compressor having a discharge temperature detection means in place of a thermal protector is provided.

EXPLANATION OF SYMBOLS

Figure 1:
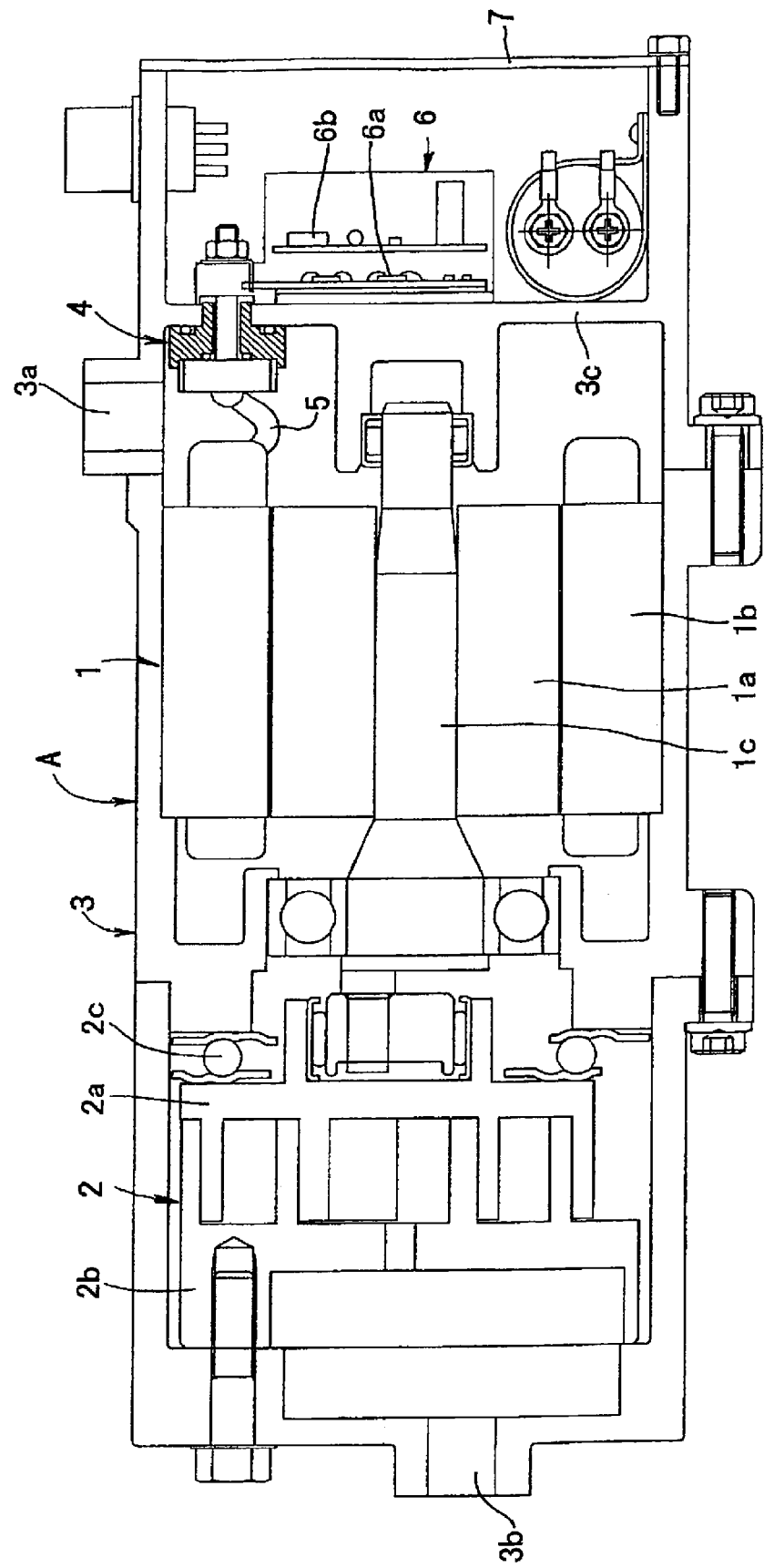
FIG. 1 is a vertical sectional view of an inverter-integrated electric scroll-type compressor according to an embodiment of the present invention.

1: three-phase motor
1a: rotor
1b: stator
1c: drive shaft
2: compression mechanism
2a: movable scroll
2b: fixed scroll
2c: rotation preventing mechanism
3: housing
3a: suction port
3b: discharge port
3c: housing end wall
4: sealed terminal
5: wire
6: drive circuit
6a: inverter
6b: power element control circuit
7: lid member
A: inverter-integrated electric compressor

THE BEST MODE FOR CARRYING OUT THE INVENTION

An electric compressor according to an embodiment of the present invention will be explained with respect to a case of an inverter-integrated electric compressor.

As depicted in FIG. 1, an inverter-integrated electric compressor A has a three-phase motor 1, such as three-phase synchronous motor or three-phase induction motor, having a rotor 1a, a stator 1b and a drive shaft 1c, and a scroll-type compression mechanism 2 having a movable scroll 2a driven for an orbital movement by the drive shaft 1c of the three-phase motor 1, a fixed scroll 2b engaging with the movable scroll 2a to form operational spaces, and a rotation preventing mechanism 2c for the movable scroll 2a. Three-phase motor 1 and scroll compression mechanism 2 are stored in a housing 3 on which a suction port 3a and a discharge port 3b are formed. A sealed terminal 4 is attached to a housing end wall 3c at a position near the suction port 3a. Three wires 5, the ends of which are fixed to three bolts of sealed terminal 4 (only one bolt and one wire are shown), are connected to three-phase input terminals of three-phase motor 1, respectively.

A drive circuit 6 of three phase-motor 1 is fixed to the outer surface of housing end wall 3c. Drive circuit 6 comprises an inverter 6a having a power element and a power element control device 6b. The circumferential wall of housing 3 extends beyond the end wall 3c, a lid member 7 is attached to the end portion of the circumferential wall, and lid member 7 covers drive circuit 6 to protect drive circuit 6 from external forces.

In the inverter-integrated electric compressor A thus constructed, three-phase motor 1 is driven by three-phase electric power with a great current supplied from drive circuit 6, and movable scroll 2a in compression mechanism 2 is driven with an orbital movement by three-phase motor 1. Refrigerant gas which has been introduced through suction port 3a into housing 3 flows through the gap between rotor 1a and stator 1b into compression mechanism 2, and the refrigerant gas is compressed in the operational spaces of compression mechanism 2 and discharged from discharge port 3b.

A thermistor (not shown) is mounted on the power element of inverter 6a in order to protect it from an overheat. Further, the power element of inverter 6a is attached to housing end wall 3c at a position near the suction port 3a to be cooled by sucked refrigerant. Therefore, a compressor suction temperature Ts can be estimated by the thermistor mounted on the power element of inverter 6a, and ultimately, a compressor suction pressure Ps can be estimated based on the saturated vapor curve of the refrigerant.

Because inverter 6a recognizes the rotational speed and the motor phase current and phase voltage of three-phase motor 1, a motor torque Tq of three-phase motor 1 can be calculated based on the motor rotational speed and the motor phase current and phase voltage of the three-phase motor 1.

Figure 2:
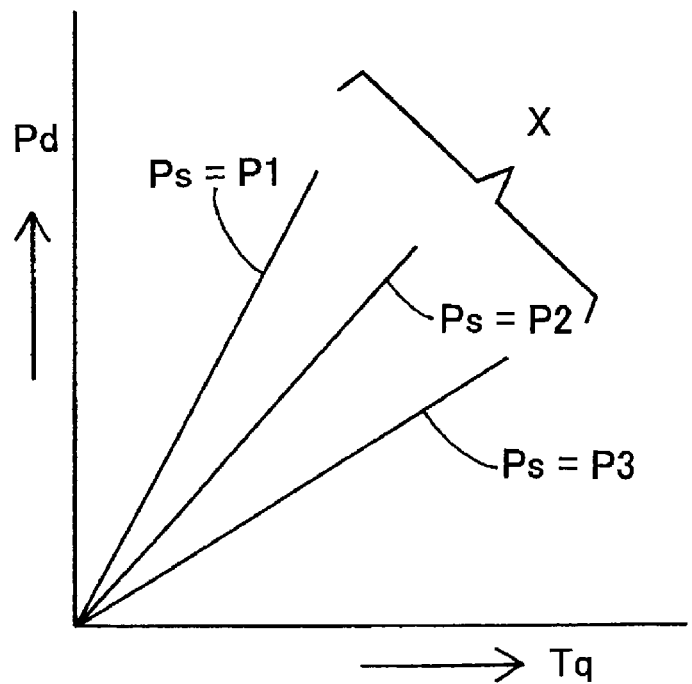
FIG. 2 is a graph showing an example of the correlation among a compressor suction pressure Ps, a motor torque Tq and a compressor discharge pressure Pd.

A compressor discharge pressure Pd can be estimated based on the compressor suction pressure Ps and the motor torque Tq, if the correlation X as exemplified in FIG. 2 among the compressor suction pressure Ps, the motor torque Tq and the compressor discharge pressure Pd is determined in advance.

Figure 3:
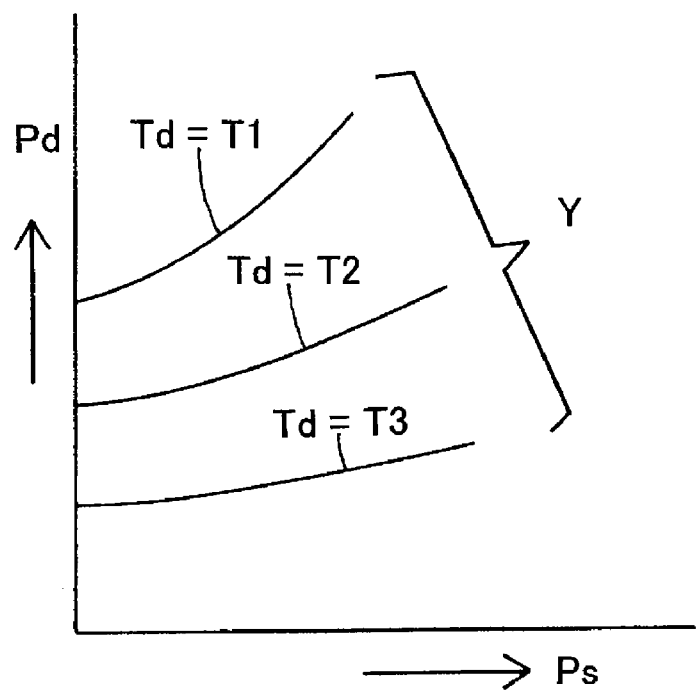
FIG. 3 is a graph showing an example of the correlation among a compressor suction pressure Ps, a compressor discharge pressure Pd and a compressor discharge temperature Td.

A compressor discharge temperature Td can be estimated based on the compressor suction pressure Ps and the compressor discharge pressure Pd, if the correlation Y exemplified in FIG. 3 among the compressor suction pressure Ps, the compressor discharge pressure Pd and the compressor discharge temperature Td is determined in advance.

A memory unit storing the correlation X and the correlation Y, and a calculation unit carrying out a series of the above-described calculations are incorporated into drive circuit 6 provided in the inverter-integrated electric compressor A. Therefore, the inverter-integrated electric compressor A has a discharge temperature detection means in place of a thermal protector.

Further, when the compressor discharge temperature Td is equal to a predetermined value or higher, drive circuit 6 stops supplying electric power to the three-phase motor 1 to stop the operation of the inverter-integrated electric compressor A. As a result, an overheat of a refrigerant hose connecting discharge port 3b of the inverter-integrated electric compressor A to the condenser of an air conditioner and an overheat of the compressor itself can be prevented.

The present invention is also applicable to an inverter-separated electric compressor. In case of the inverter-separated electric compressor, because an inverter 6a with a power element and a drive circuit 6 with a power element control device 6b are separated from the compressor, a compressor suction temperature Ts cannot be estimated by using a thermistor mounted on the power element of the inverter 6a. Therefore, a compressor suction pressure Ps may be determined by directly measuring it by a pressure sensor (not shown) provided or by estimating it based on either a compressor suction temperature or a compressor housing temperature at a position near a suction port measured by a temperature sensor disposed separately. A series of the following operations are carried out in the same manner as those in the inverter-integrated electric compressor A, thereby realizing a discharge temperature detection means in place of a thermal protector.

INDUSTRIAL APPLICATIONS OF THE INVENTION

The present invention is applicable to an inverter-integrated or inverter-separated electric compressor not only with a three-phase motor but also with a single-phase motor, a two-phase motor or a multi-phase more than three-phase motor. Further, because both a conventional thermal protector and the attachment parts thereof are not necessary in the present invention, an inverter-integrated or inverter-separated electric compressor according to the present invention is suitable as a compressor provided in a refrigerant circuit of an air conditioner for vehicles which is required to be mounted within a limited space.

The invention claimed is:

1. An inverter-integrated electric compressor comprising a control device which estimates a compressor suction pressure based on a temperature of a power element of an inverter, calculates a motor torque based on a motor rotational speed and motor phase current and phase voltage, estimates a compressor discharge pressure based on said compressor suction pressure and said motor torque, and estimates a compressor discharge temperature based on said compressor suction pressure and said compressor discharge pressure.

2. The electric compressor according to claim 1, wherein said control device turns off the compressor when said compressor discharge temperature is equal to a predetermined value or higher.

3. The electric compressor according to claim 2, wherein said compressor is a compressor provided in a refrigerant circuit of an air conditioner for vehicles.

4. The electric compressor according to claim 1, wherein said compressor is a compressor provided in a refrigerant circuit of an air conditioner for vehicles.

* * * * *